Patented May 31, 1932

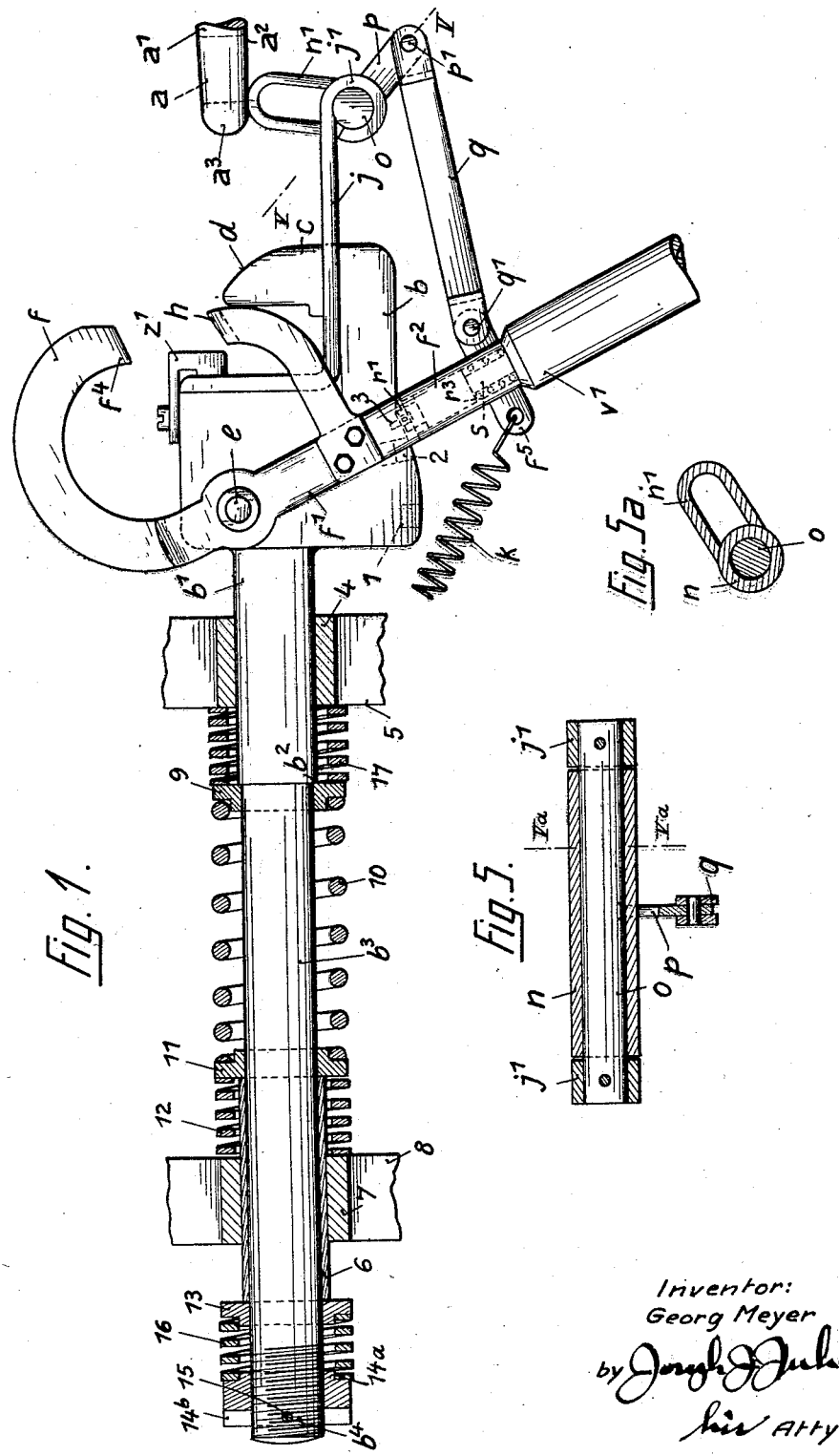

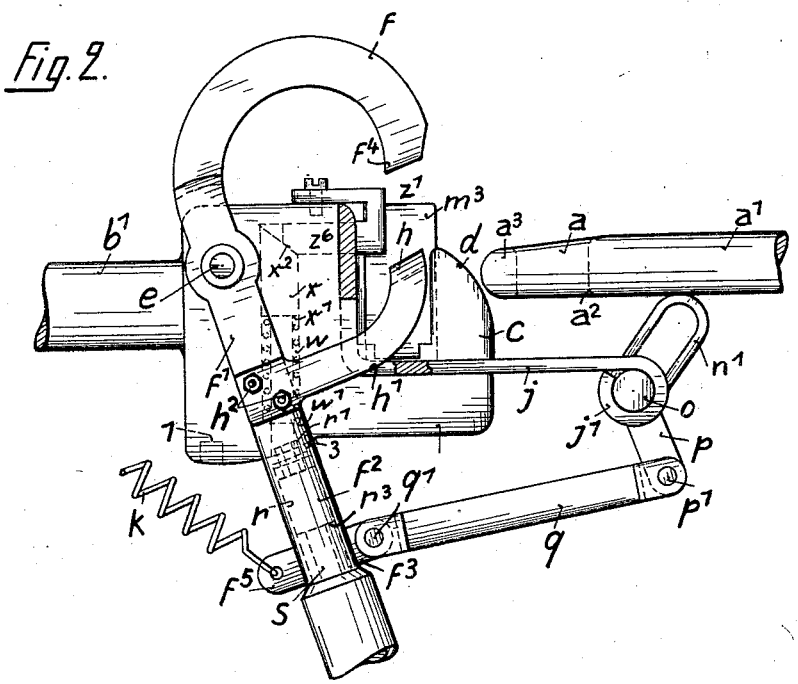
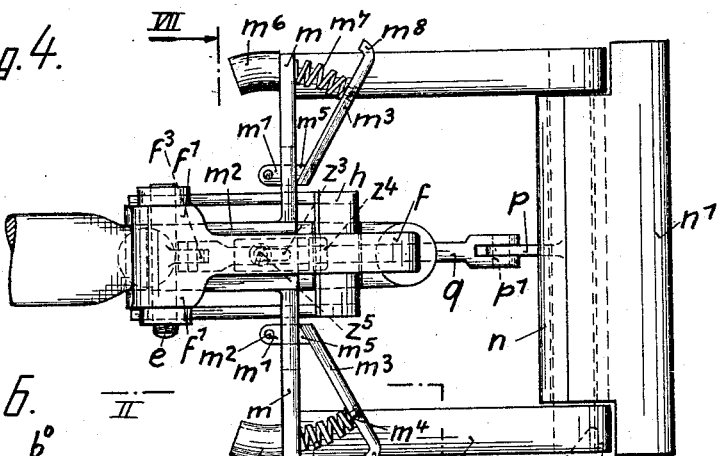
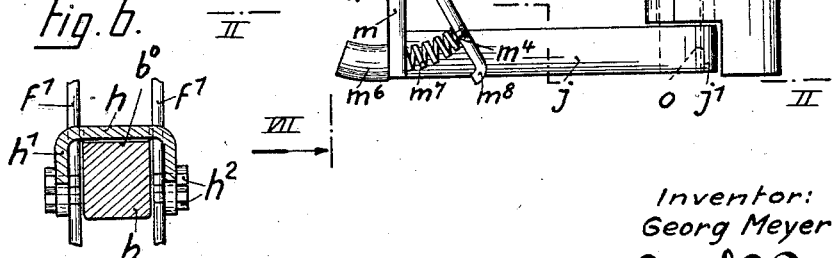

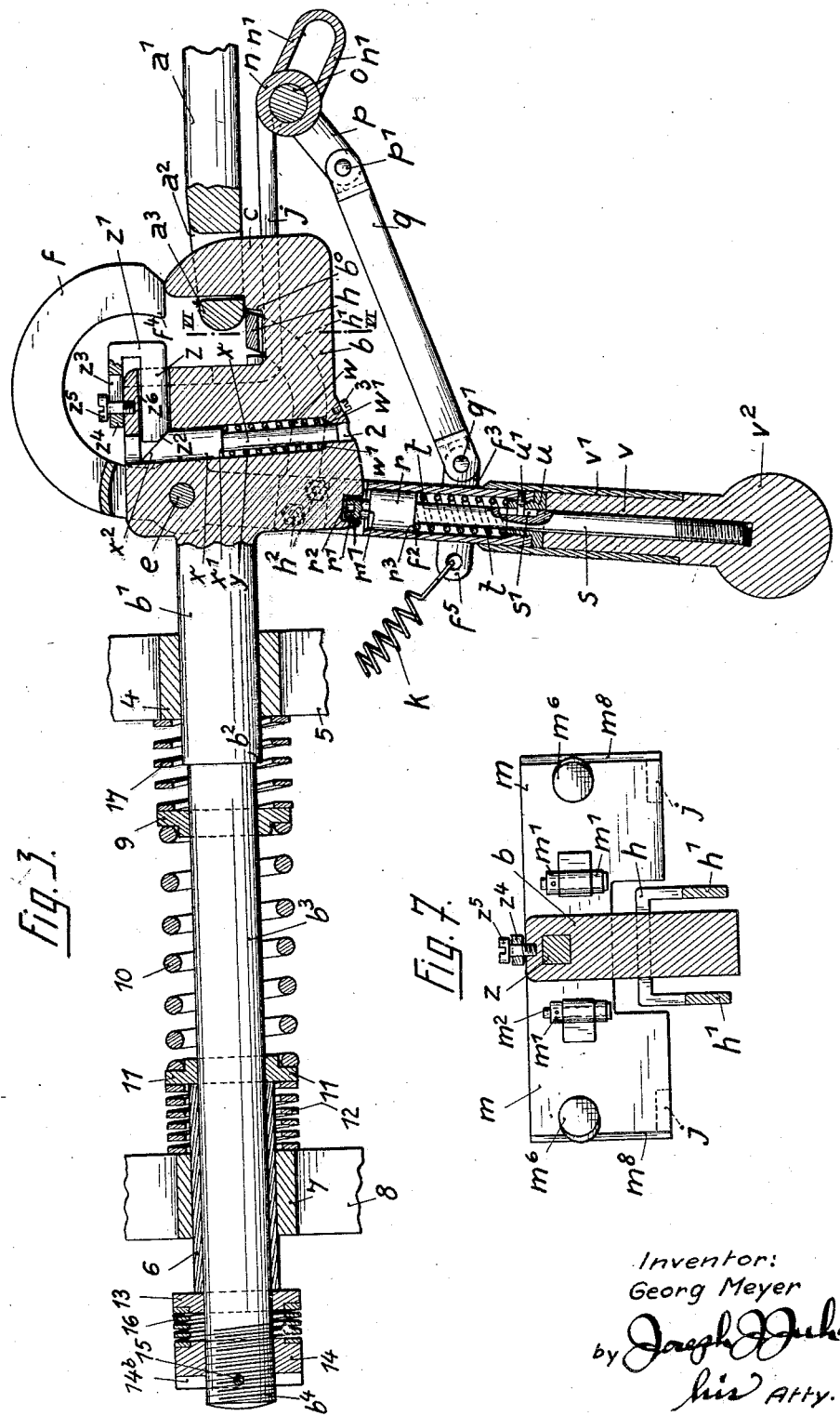

1,860,391

UNITED STATES PATENT OFFICE

GEORG MEYER, OF BERLIN-CHARLOTTENBURG, GERMANY

ACCIDENTS PREVENTING COUPLING DEVICE

Application filed May 31, 1930, Serial No. 458,063, and in Germany February 28, 1930.

This invention relates to that class of coupling devices which are to be used especially for automobile tractors with trailer. For preventing accidents, trains including a trailer must be coupled without obligating an operator to enter between the tractor and trailer. Furthermore the percussion connected with the encountering of the tractor and the trailer should be yieldingly intercepted and the eye piece shaft of the trailer should be held approximately in the height of the coupling member provided on the tractor. In satisfying these conditions it is to be borne in mind that the longitudinal axis of the tractor and the trailer are subjected to large relative angular and transversal movements both in vertical and horizontal planes, not only during the engaging and disengaging of the coupling, but also during the journey, when the coupling is engaged.

It is customary to provide the automobile tractor with a coupling fork and the trailer with a coupling shaft terminating in an eye. Since it is usual for more trailers to be employed than tractors, the invention preserves the usual form of the coupling shaft and the usual shape of its eye-piece, in order to avoid constructional alterations in the trailers.

The coupling should be safeguarded or locked in its closed position to the intent that during travel at night, for instance during climbing a hill in a region not illuminated, no accidents may arise on account of a trailer remaining behind in consequence of an unintentional disengagement of the coupling.

All these requirements are satisfied by the present invention, according to which the tractor is provided with a coupling pivot instead of a coupling fork, the coupling pivot being formed at its upper portion with a receiving surface declined backward and to both sides. The coupling shaft terminating in an eye piece is guided during the relative approachment of the coupling members into the height of the declined upper pivot portion by means of a liftable leading member. The pivot is provided with a locking member and a disengaging member for the same, and the leading member is connected with the locking member in such a manner, that, when the eye piece of the coupling shaft comes above the coupling pivot, the disengaging member will be pushed forward by the eye piece, whereby the locking member will be brought out of that position, in which it had been during the open position of the coupling device. Then a spring attached to the locking member makes the said locking member rebound into its locking position and at the same time the liftable leading member is lowered through the connection between the locking and the leading members and the eye piece of the coupling shaft is pushed downward upon the coupling pivot.

Furthermore the invention consists in the construction, combination and arrangement of elements described particularly in the following specification and shown in the drawings.

Figure 1 is partly a side elevation view and partly a longitudinal vertical sectional view of the coupling device shown locked in the open position of its parts. The percussion receiving device is shown in its middle position.

Figure 2 is a similar side elevation view, the parts being shown in relative position before the beginning of the engagement of the coupling device; a portion of this figure is a vertical sectional view according to the line II—II of the Figure 4.

Figure 3 is partly a side elevation view and partly a longitudinal vertical sectional view similar to Figure 1, the parts of the coupling device being shown locked in the closed or engaged position of the coupling device. Furthermore the percussion receiving device is shown in its compressed position caused by a relative approachment of the tractor and the trailer.

Figure 4 is a plan view of the parts shown in Figure 3.

Figure 5 is a sectional transversal detail view taken along the declined line V—V of Figure 1.

Figure 5a is a vertical sectional detail view taken along the line Va—Va of the Figure 5.

Figure 6 is a sectional transversal vertical detail view taken along the line VI—VI of Figure 3, and Figure 7 is a front elevation view, seen in the directions of the arrows VII, VII in Figure 4.

Referring now to the drawings, the coupling bar $a^1$ attached on the trailer (not shown) is formed at its forward end in the usual manner that is to say in the shape of an eye piece $a$.

The drawing shaft $b^1$ is yieldingly connected with the coupling frame attached to the tractor (not shown) and is formed at its back end into a drawing hook $b$ terminating in a vertical pivot $c$ having at its upper or end portion a receiving surface $d$ declined backward and to both sides.

In the engaged position the eye piece $a$ of the coupling shaft $a^1$ is located upon the pivot $c$, as best seen in Figure 3, and may be turned in a horizontal plane round the said pivot. For the purpose that the eye piece $a$ also may be swung in vertical planes relatively to the pivot according to the relative movements between the trailer and the tractor and may occupy any declined and oblique position, the eye piece is rounded at its inner surface $a^2$.

The drawing shaft $b^1$ has a shoulder $b^2$ and is continued to form a bolt $b^3$ terminating in a threaded portion $b^4$. The shaft $b^1$ slides in a backward guide member 4 formed or secured upon a traverse 5 of the coupling frame fixed on the tractor frame. The bolt $b^3$ carries a slidable sleeve 6 sliding in a forward guide member 7 formed or secured upon the traverse 8 of the coupling frame.

A spring plate or washer 9 of angular section is slidable upon the bolt $b^3$ and abuts against the shoulder $b^2$, as best seen in Figure 1. A similar washer 11 is also slidable upon the bolt $b^3$. Between the washers 9 and 11 a main spring 10 is arranged in such a manner that its ends are carried by the inner flange of the angular section of each washer. The sleeve 6 abuts against the forward washer 11. Between the forward guide member 7 and the forward washer 11 a spring 12 encircling the sleeve is arranged.

A spring plate or washer 13 of angular section is slidably arranged upon the projecting end of the bolt $b^3$ and abuts against the forward end of the sleeve 6. A nut 14 is threaded upon the portion $b^4$ and formed with a backward ring flange 14$a$ to form a spring carrier. Between the washer 13 and the nut 14 a spring 16 is arranged. The nut is formed with a number of radial grooves 14$b$ to be secured by means of a cotter 15 in a selected position upon the bolt portion $b^4$ provided with a transversal boring. Between the guide member 4 and the washer 9 a third spring 17 is interposed.

The application of the three springs 10, 16 and 17 is disclosed by the German patent specification 477,733 of the inventor, published on June 13, 1929. But the soft receipt of the percussions generated during the engagement of the coupling device, and a completely noiseless operation of the whole device may not be obtained without the addition of the spring 12 not disclosed before.

The three springs 12, 16 and 17 are weaker than the spring 10 and have such an initial tension that in the outermost positions of the draw shaft $b^1$ the respective springs are in contact with the appertaining washer or guide members. The initial tension of the said springs may be adjusted by turning the nut 14.

The initial tension of the weakest springs opposes at the beginning of each percussion the prevailing motion. Therefore smaller percussions are taken up either in well known manner by the springs 16 and 17 or according to the present invention by the added spring 12. In the case of larger percussions either the springs 16 and 17, or the spring 12 are or is compressed, till their or its convolutions are tightened together, and then the convolutions of the main spring 10 are compressed.

The forward shank of the hook $b$ is continued on both sides by fixed walls $m$ carrying near their inner ends hinge eyes $m^1$ which are transversed by a hinge bolt $m^2$ transversing also a forward projecting eye $m^5$ of an oblique guiding wall $m^3$. Each carrying wall $m$ is continued at its outer end to form an arcuated housing $m^6$ into which a convoluted spring $m^7$ reaches, the axis of which is arcuated concentrically to the hinge bolt $m^2$. The backward spring end is attached to the guide wall $m^3$ at $m^4$. The guide wall is provided at its outer edge with a forward turned guiding flange $m^8$. The wall $m$ carries at the lower edge of its outer end a backward extending arm $j$ serving to guide the sliding lower edge of the guide wall $m^3$.

The arms $j$ are rolled downwardly at their backward end each to form a bearing eye traversed by an axle $o$ carrying a liftable leading member, said lifting leading member as an example being in the shape of a tube $n$, a sheet metal strap $n^1$ being bent up in U-shape and welded with the ends of the U-shanks into the tube, as best shown in Figure 5$a$. The tube $n$ carries a downwardly extending arm $p$ traversed by a hinge bolt $p^1$ traversing also a forward extending link $q$.

A counterhook $f$ is rockably mounted upon the hook $b$ by means of a hinge bolt $e$ traversing the hook member $b$. The counterhook is formed at its upper and lower portions in one piece and at its intermediate portion in two branches $f^1$ extending at either side along the hook member $b$. The lower portion of the counterhook forms a tube-shaped bar $f^2$. Within the upper end of the tube $f^2$ a plug $r$ is slidably arranged. The plug $r$ is downwardly continued to form a bar $s$, a shoulder $r^3$ being formed between the plug and bar.

Within the tube $f^2$ a circular chamber exists around the bar $s$. This chamber contains a convoluted compression spring $t$ abutting with its upper end against the plug $r$ and with its lower end against a ring $u$ threaded from below into the tube $f^2$. A locking pin $u^1$ traverses the tube $f^2$ and the ring $u$ and reaches into a longitudinal groove $s^1$ of the bar $s$, thereby preventing turning of the bar $s$ and the plug $r$ within the tube $f^2$. A handle $v$ terminating into a knob $v^2$ is threaded from below upon the lower end of the bar $s$. A tube-shaped piece $v^1$ is welded upon the handle $v$ and serves to guide the handle $v$ upon the tube $f^2$.

An eye piece $f^3$ is welded onto the backside of the tube $f^2$ and traversed by a hinge bolt $q^1$ traversing also the link $q$. Another eyepiece $f^5$ is welded onto the forward side of the tube $f^2$ and serves for the attachment of the backward end of a tension spring $k$ the forward end of which is attached to the coupling frame, so that the spring $k$ tends to draw forward the hook portion $f^2$.

The hook $b$ has at its lower face a notch 1 limited forward and backward, behind this another notch 2 also limited forwardly and backwardly and a little behind the notch 2 a pin 3. The plug $r$ is formed at its upper end to be a flat head $r^1$ and may be inserted with this head into either of the notches 1 and 2. Furthermore the flat head $r^1$ has a boring $r^2$ opening upwardly. The plug $r$ may be lodged with its bored end upon the pin 3.

When the head $r^1$ of the plug $r$ is inserted in the notch 1 the counterhook $f$ is lowered to engage the pivot $c$ and to close the hook $b$, as best seen in Figure 3. In this case the eye piece $a$, should it be lodged upon the pivot $c$, will be prevented from rising by a nose or projection $f^4$ formed on the counterhook $f$ and extending toward the inside of the hook. Furthermore the liftable leading member $n$, $n^1$ is lowered on account of the connection between the counterhook and the member $n$, $n^1$ by the link $q$, whereby the shaft $a^1$ of the eyepiece $a$ is permitted to go downward, till it lies upon the hub portion $n$ of the leading member $n$, $n^1$.

When the handle $v$ is pulled downwardly by means of the knob $v^2$, the head $r^1$ goes out of the notch 1. Then the handle $v$ may be pushed backward against the action of the spring $k$ tending to draw forward the handle $v$ and the head $r^1$ may be lodged with its boring $r^2$ upon the pin 3, as best seen in Figure 1. In this position the counterhook $f$ is broadly open. During the transitory motion the leading member $n$, $n^1$ together with the eye piece $a$ is raised, so that the eye piece $a$ occupies a position above the pivot $c$. Under these circumstances the tractor may be driven forward, the trailer not participating on this motion.

Should it be desired to engage the coupling again, the knob $v$ is pulled downwardly, whereby the head $r^1$ of the plug $r$ is lowered below the pin 3; then the spring $k$ is permitted to act upon the lever $f$ with the result that the head $r^1$ is lodged in the notch 2, as best seen in Figure 2.

A substantially vertical boring $w$ having a step $w^1$ is made in the hook $b$ above the notch 2. A bolt $x$ provided with a shoulder $x^1$ is inserted in the boring $w$ from above and is longitudinally slidable therein. A spring $y$ is interposed between the step $w^1$ and the shoulder $x^1$ and tends to push upwardly the bolt $x$. This bolt has at its upper end a declined face $x^2$. Another bolt $z$ is guided in a horizontal longitudinal boring $z^6$ and has at its forward end a declined face $z^2$ corresponding to the face $x^2$. The bolt $z$ has at its backward end an upturned portion $z^1$, serving as an abutment for the rounded forward end $a^3$ of the eye piece $a$. The portion $z^1$ terminates in a horizontal upper face, upon which a flat piece $z^4$ having a slot $z^3$ is welded. The slot $z^3$ is traversed by a vertically arranged screw bolt $z^5$ inserted into the hook member $b$ from above whereby the bolt $z$ is prevented from being turned on its longitudinal axis in a very simple manner.

After the head $r^1$ has been inserted in the notch 2 and accordingly the member $n$, $n^1$ is raised, as best seen in Figure 2, the tractor may be driven backward and approached to the trailer. During this movement the member $n$, $n^1$ elevates the eye piece $a$ to such a height that the eye piece lies on the portion $n^1$. The impact or percussion generated by the first encountering is transmitted through the shoulder $b^2$ upon the washer 9 and through the main spring 10 and the washer 11 upon the weaker spring 12 which will be compressed and receive the impact. It is very important to diminish the percussion in the mentioned way. Thereby the danger is avoided or at least lessened that any part of the coupling device or the vehicle break and accordingly the safety of the driving is assured.

In further backward driving the tractor toward the trailer the coupling device is brought with the opening to be found between the pivot $c$ and the counterhook nose $f^4$ over the eye piece, this eye piece being driven further upwardly by the declined face $d$ of the pivot $c$. At last the bolt portion $z^1$ strikes the forward end of the eye piece $a$, whereby the bolt $z$ is shifted forward. This motion is transmitted through the oblique faces $z^2$, $x^2$ upon the bolt $x$, which is driven downwardly against the action of the spring $w$. The impact upon the hook shaft $b^1$ is taken up by the spring 12 in the manner already mentioned. The bolt $x$ pushes the head $r^1$ against the action of the spring $t$ out of the notch $h$, whereupon the spring $k$ draws the counterhook portion $f^2$ forward in the position shown in Figure 1. At the same time the link $q$ draws downward the leading member portion $n^1$, so that the eye piece $a$ may fall down on the pivot $c$. This falling is caused positively by the counterhook nose $f^4$ pressing the eye piece $a$ downwardly on the pivot $c$. Now the coupling is closed and safeguarded in its closed position and at the same time the counterhook nose $f^4$ prevents any rising of the eye piece.

The described actions take place both when the tractor is driven directly from the front side toward the trailer and when it is driven in a direction oblique to the longitudinal axis of the trailer. In the latter case the eye piece $a$ is directed by the leading wall $m^4$ toward the sidely declined portion $d$ of the pivot $c$.

After the coupling has been engaged, very large angular motions between the tractor and the trailer may take place, the leading wall $m^4$ being pressed toward the carrying wall $m$ against the action of the spring $m^7$. Furthermore the impacts or precussions being produced by the transmission of retardations or accelerations from the tractor to the trailer or vice versa are taken up by the spring arrangement 10, 12, 16, 17.

It is desirable for the disengagement of the coupling device that the eye piece $a$ is raised on both sides equally, so that it does not occupy a sloping position. For that reason a yoke-shaped raising member $h$ is provided which is positioned in a transversal groove $b^0$ of the hook member $b$. The raising member is made of a flat bar and has angular end pieces $h^1$ secured each upon the outside of the counterhook portion $f^2$ by means of two head screws $h^2$. Accordingly for the disengagement of the coupling device it is sufficient to bring the counterhook portion $f^2$ out of the position of the Figure 3 into the position of the Figure 1, whereupon the tractor may be driven forwardly away from the trailer.

What I claim is:

1. In an accidents preventing coupling device, especially for automobile tractors with trailer, in combination with a hook member provided with two notches and a receiving pin, a counterhook, a locking plug slidably mounted on the counterhook and provided with a flat head to be inserted in either of the notches and with a boring in the flat head fitting upon the receiving pin, all the said parts being arranged in such a way, that the flat head inserted in the first notch locks the counterhook in its closing position, the flat head lodged upon the pin locks the counterhook in its open position and the flat head inserted in the second notch permits the eye piece to be brought in between the hook member and the counterhook.

2. In combination with a coupling device according to claim 1, a liftable leading member and a link connecting the counterhook and the leading member.

3. In combination with the coupling device according to claim 1 a detent bolt longitudinally slidable in the hook member striking the eye piece a little before the coupling engagement and intended to be shifted forward, a second bolt slidably mounted in the hook member in a substantially vertical direction and serving to free the locking head from the corresponding notch, and means to transmit the forward motion of the detent bolt to the vertically movable bolt.

4. In an accidents preventing coupling device, especially for automobile tractors with trailer, in combination with a hook member terminating in a vertical cylindrical pivot, a counterhook rockably mounted on the hook member and a yoke-shaped raising member secured on the counterhook and to be countersunk in a transversal groove of the hook member.

5. In an accidents preventing coupling device, especially for automobile tractors with trailer, in combination with a hook member terminating in a vertical cylindrical pivot having a receiving face declined forward and to both sides, and two obliquely arranged leading walls positioned at either side of the hook member for the purpose to direct the eye-piece of the trailer to the receiving face of the pivot in the case that the tractor should be approached to the trailer in an oblique direction.

6. In combination with the device according to claim 5 leading walls angularly movable and springs to hold yieldably the leading walls in an oblique direction.

7. In combination with an accidents preventing coupling device, comprising a hook member terminating in a vertical cylindrical pivot having at its end a receiving face declined backward and to both sides, and a liftable leading member positioned behind the pivot: carrying arms arranged below the pivot portion of the hook member and extending behind the pivot, and a liftable leading member rockably mounted upon the said arms.

8. In combination with an accidents preventing coupling device, comprising a hook member terminating in a vertical cylindrical pivot having at its end a receiving face declined backward and to both sides, and a liftable leading member positioned behind the pivot: a detent bolt longitudinally movable in the hook member striking the eye piece a little before the coupling engagement and intended to be shifted forward, a second bolt substantially vertically movable in the hook member and serving to free the locking head from the corresponding notch, means to transmit the forward motion of the detent bolt to the vertically movable bolt and a spring pushing backward the vertically movable bolt.

9. In combination with an accidents preventing coupling device, comprising a hook member terminating in a vertical cylindrical pivot having at its end a receiving face declined backward and to both sides, and a liftable leading member positioned behind the pivot: a leading member, comprising a tube, an arm welded to the tube and a sheet metal member bent in U-shape and welded with the ends of the U-shanks to the tube.

10. In an accidents preventing coupling device, especially for automobile tractors with trailer, in combination with a hook member terminating in a shaft comprising a bolt and shoulder portion, a coupling frame, forward and backward means to guide the shaft longitudinally to the coupling frame, a sleeve slidable upon the said bolt portion of the shaft, a washer abutting against the shoulder, two other washers abutting each against either end of the sleeve, a nut adjustable upon the end of the hook shaft, a main spring interposed between the washer abutting against the shoulder and the ring abutting against the back end of the sleeve, a weaker spring interposed between the washer abutting against the shoulder and the backward guiding means, a weaker spring interposed between the nut and the washer abutting against the forward sleeve end, and a weaker spring interposed between the forward guiding means and the washer abutting against the backward sleeve end, the said springs acting in a manner whereby the percussions generated during the engagement of the coupling device are softly received and the operation of the coupling device is noiseless.

In testimony whereof I have signed this specification.

GEORG MEYER.